J. G. ROSS.
TIDE MILL.
No. 30,591. Patented Nov. 6, 1860.
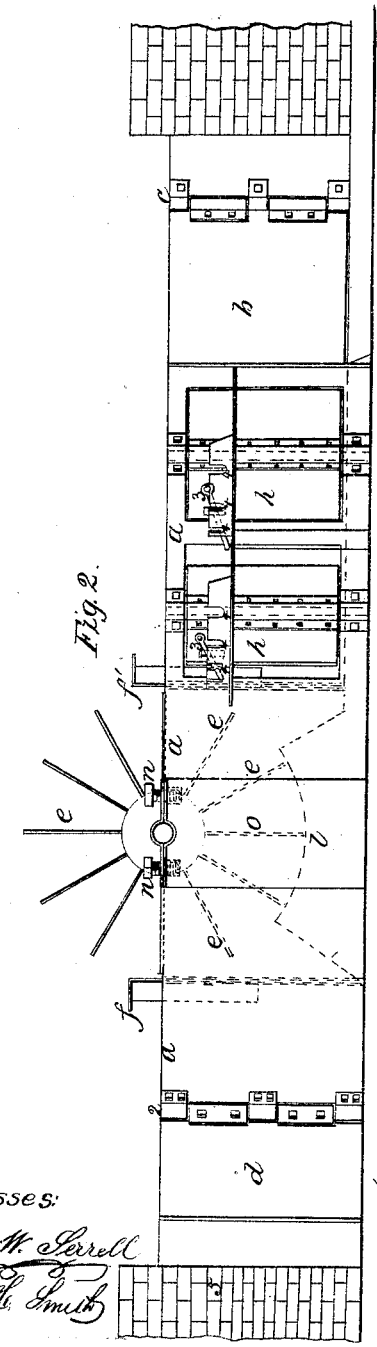
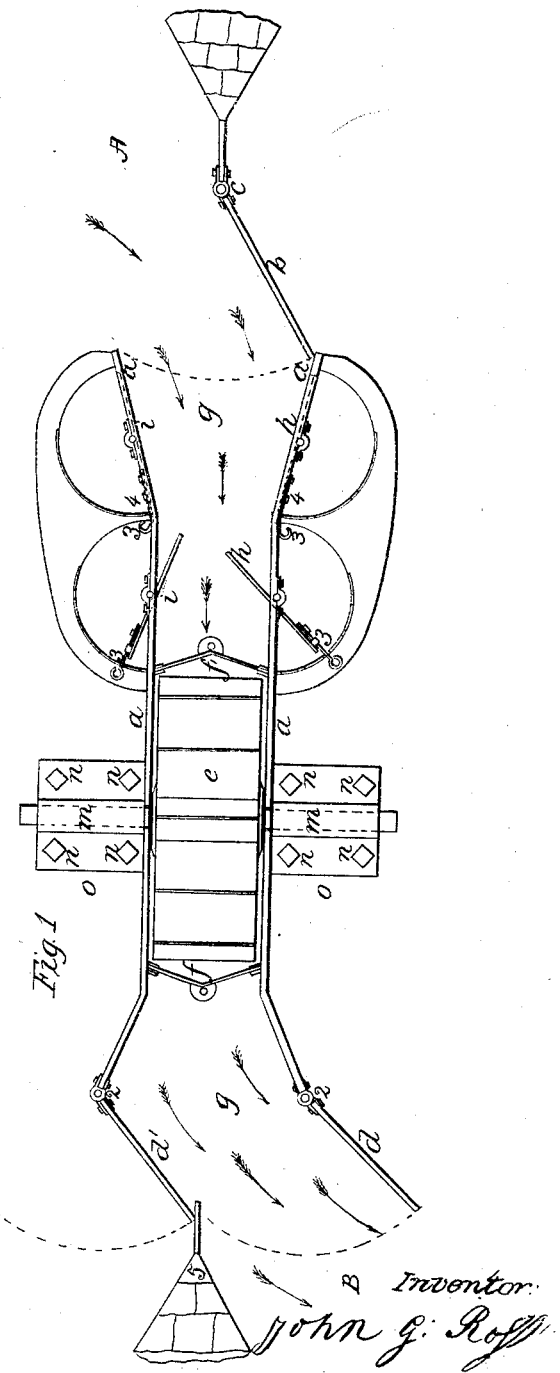
Witnesses:
Lemuel W. Serrell
Chas. H. Smith
Inventor:
John G. Ross

UNITED STATES PATENT OFFICE.

JOHN G. ROSS, OF NEW YORK, N. Y.

ARRANGEMENT OF GATES FOR DIRECTING THE FLOW OF WATER UPON TIDE-WHEELS.

Specification of Letters Patent No. 30,591, dated November 6, 1860.

*To all whom it may concern:*

Be it known that I, JOHN G. Ross, of the city and State of New York, have invented, made, and applied to use certain new and useful Improvements in Tide-Mills; and I do hereby declare that the following is a full, clear, and exact description of the nature of my said invention, reference being had to the annexed drawing, making part of this specification, wherein—

Figure 1 is a plan of my said tide mill, and Fig. 2 is a side elevation of the same.

Similar marks of reference denote the same parts.

My said invention consists in an arrangement of gates that direct the water in such a manner that the wheel revolves in one direction whether the tide is rising or falling, combined with sliding and swinging gates for regulating the action of the water on the wheel, and the filling or emptying of the pond.

In the drawing $a$, $a$, represent the walls of the flume or raceway which may be of any desired construction.

$b$, is a gate at one end swinging on the pier or embankment at $c$.

$d$, $d'$, are gates swinging at 2, 2, upon suitable posts at the ends of the walls $a$, $a$, and shutting against the abutment 3.

$e$, is the tide wheel, and $f$, $f'$, are gates across the flume $g$, in front and behind the wheel; these gates $f$, $f'$ are set in slides on the walls $a$, $a$, and are to be raised and lowered as required by any usual or convenient mechanism, so as to regulate the flow of water to the wheel, and also answer for shutting off the water from the wheel if repairs are required.

$h$, $h$, and $i$, $i$, are swinging gates in the walls $a$, $a$, of the flume; said gates may be sustained more or less open by the latches 3, 3, taking the notched racks 4, 4.

The operation is as follows: We will suppose the water to be running from the bay or river A, into the pond B, as represented by the arrows, the gate $d$, will be open to the pond, and the gate $d'$, shut to the flood. In its passage through the flume the wheel $e$, is revolved by the water and the gate $f'$, regulates the amount supplied; so that the power will be uniform. If the mill tender finds that the pond is not filling up fast enough so as to maintain the proper relative levels, he opens the gates $h$, $h$, more or less, and the water flows in so that the pond is entirely full as the change of tide takes place. When the ebb commences the gate, $b$, swings across of itself and also the gate, $d$, closes and the gate, $d'$, opens, and the water runs through and revolves the wheel in the same direction as before; and if more water remains in the pond than required, the gates $i$, $i$, are opened more or less to bring the water to a level by then the change again takes place.

The wheel $e$, should be made as large a diameter as possible in order that it may not be affected by being immersed more or less at high or low tide; I prefer that a wheel of about one hundred feet in diameter be used and with a breadth of face regulated according to the quantity of water passing into the mill pond: $l$, is a concavity formed in the bottom of the raceway see dotted lines in Fig. 2, of a curvature corresponding to the periphery of the wheel, so as to cause the buckets to move with as little loss of water as possible; and $m$, $m$, are the journal boxes of the wheel shaft that are provided with regulating screws $n$, $n$, passing through said boxes and resting on the bearing blocks $o$, $o$, so that said wheel can be adjusted with the greatest accuracy in order that its buckets may travel as closely to the sides and bottom of the raceway and not cause friction by contact.

What I claim and desire to secure by Letters Patent is—

The arrangement of the gates $b$, $d$, $d'$, for directing the flow of water, in combination with the swinging gates $h$, $h$, and $i$, $i$, for regulating the filling or emptying of the pond, and with the gates $f$, $f'$, to regulate the supply to the wheel, in the manner and for the purposes specified.

In witness whereof I have hereunto set my signature this 15th day of September 1860.

JOHN G. ROSS.

Witnesses:
LEMUEL W. SERRELL,
CHAS. H. SMITH.